No. 644,478. Patented Feb. 27, 1900.
T. B. TINNEY.
BICYCLE CAROUSEL.
(Application filed June 13, 1898.)
(No Model.) 2 Sheets—Sheet 1.
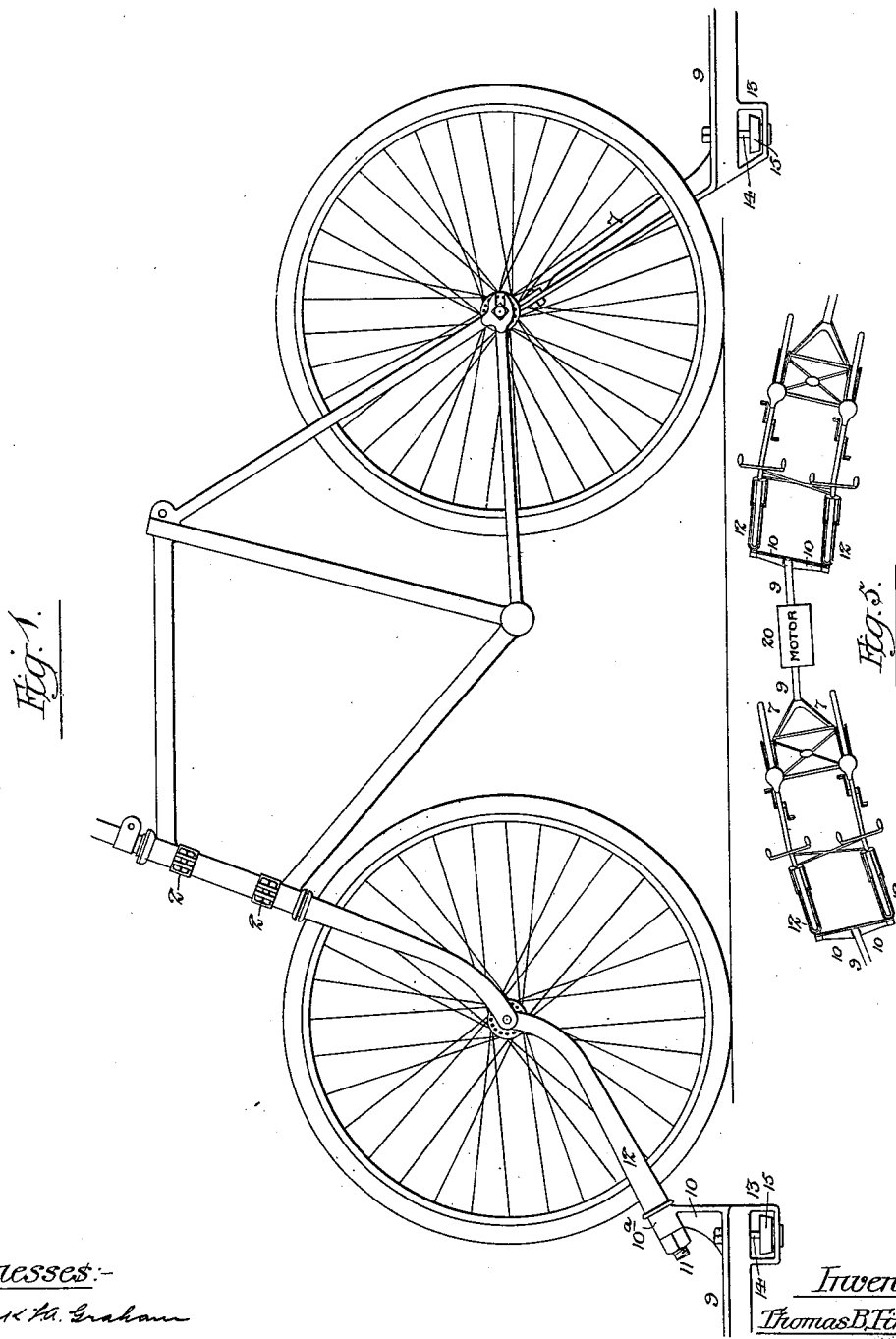

No. 644,478. Patented Feb. 27, 1900.
T. B. TINNEY.
BICYCLE CAROUSEL.
(Application filed June 13, 1898.)
(No Model.) 2 Sheets—Sheet 2.

Witnesses:-
Frank H. Graham.
Louis M. Whitehead.

Inventor:
Thomas B. Tinney
by his Attorneys
Howson & Howson

UNITED STATES PATENT OFFICE.

THOMAS B. TINNEY, OF PHILADELPHIA, PENNSYLVANIA.

BICYCLE-CAROUSEL.

SPECIFICATION forming part of Letters Patent No. 644,478, dated February 27, 1900.

Application filed June 13, 1898. Serial No. 683,329. (No model.)

*To all whom it may concern:*

Be it known that I, THOMAS B. TINNEY, a citizen of the United States, residing in Philadelphia, Pennsylvania, have invented certain Improvements in Bicycle-Carousels, of which the following is a specification.

My invention consists of certain improvements in the bicycle-carousel for which I obtained Letters Patent No. 596,342, dated December 28, 1897, one object of my present invention being to provide for guiding the bicycles and retaining them in the upright position without undue friction, a further object being to connect the pair of bicycles placed side by side in such manner as to constitute them practically a unit, and a still further object being to provide for starting and, if desired, also for keeping in motion the series of bicycles independently of or in addition to the force exerted by their riders. These objects I attain in the manner hereinafter set forth, reference being had to the accompanying drawings, in which—

Figure 3:
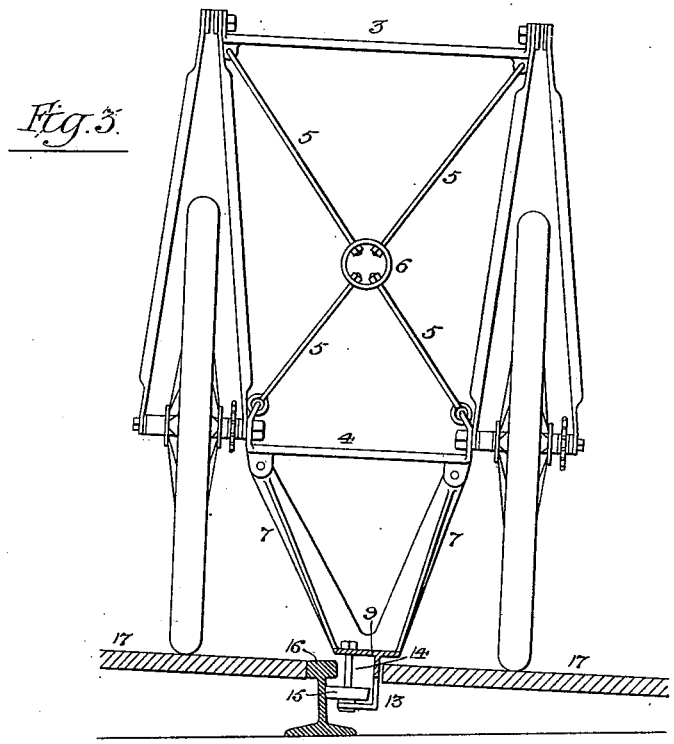
Figure 4:
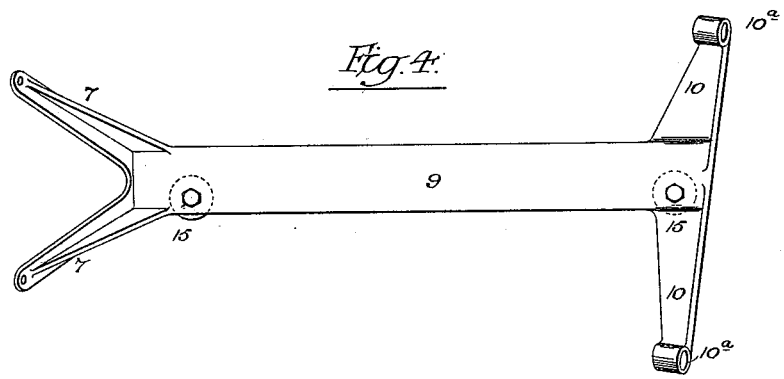
Figure 2:
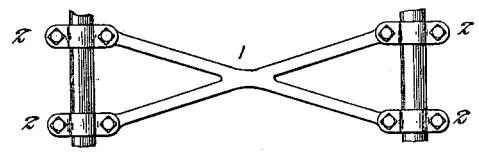

Figure 1 is a side view of a bicycle with connecting attachments constructed in accordance with my invention. Fig. 2 is a front view of the connection for the forward portions of the frames of a pair of bicycles. Fig. 3 is a transverse section of part of the track, showing the connections for the rear portion of the frames, also part of the guiding and connecting frame. Fig. 4 is a plan or top view of one of said guiding and connecting frames, and Fig. 5 is a diagram illustrating one of the features of the invention.

The bicycles which I employ may be of any ordinary construction and are arranged in pairs side by side, as many of these pairs of bicycles being used as the diameter of the carousel floor or track will accommodate. Each pair of bicycles is connected so as to constitute practically a unit, the front bars of the frames being connected by a transverse brace 1, which, as shown in Fig. 2, is forked at each end, each leg of the fork being connected to the front bar of one of the bicycle-frames by means of a clamp 2, embracing said bar, so that each brace is connected to the forward portion of each frame at two points separated vertically some distance from each other. The rear forks of each frame are connected together at top and bottom, the top connection consisting of a transverse bar 3, hung to the same bolts, whereby the upper ends of the rear forks are secured to the rear standards of the frame, the lower ends of the inner forks being connected by a transverse bar 4, secured to the projecting inner ends of the rear axles of the bicycles.

Each of the arms 3 and 4 has at each end an eye for the reception of one end of a diagonal brace or tie rod 5, the four tie-rods passing at their inner ends through openings in a ring 6 and being provided with nuts on the inner side of said ring, so that each tie-rod can be independently adjusted. The lever connecting bar 4 also has at each end a depending lug, which is connected to the upwardly-projecting forks 7 at the front end of a longitudinal connecting-bar 9, whereby one pair of bicycles is connected to the following pair, said bar 9 having at its rear end laterally-projecting arms 10, each having near its outer end an eye 10ª for the reception of a stem 11 upon a fork 12, which embraces the front wheel of a following bicycle and is connected to the front axle of the same either inside or outside of the lower end of the front or steering fork of said bicycle.

The bar 9 has near each end a depending hanger 13, and each hanger supports the lower end of a spindle 14, the upper end of which is secured to the bar, each spindle carrying an antifriction-roller 15, which is adapted to run against the web of a rail 16, secured upon the floor or other portion of the building in which the carousel is erected, the floor 17, upon which the bicycles run, being by preference slightly inclined downwardly toward the axis of the circular path in which the bicycles travel, so that the latter will naturally incline inwardly to overcome the effects of centrifugal force, said floor being slotted adjacent to the rail 16, so as to permit of the passage of the depending hangers 13 and the antifriction-rollers carried thereby.

The arms 10 of the connecting-bar 9 are disposed at an angle other than a right angle to the said bar 9, so that the inner and outer bicycles of each pair may be disposed side by side and rigidly connected, as shown in Fig. 5.

In order to assist in starting the connected bicycle structure and to relieve the riders from the labor involved in effecting such starting, I prefer to introduce between two pairs of bicycles a motor 20, as shown in Fig. 5, this motor being driven by any suitable power, preferably electric, which power may be cut off when the rotating structure is fairly under way or may be continued during the entire time of rotation, as desired.

It will be observed that the connecting-frame is supported vertically wholly by the bicycles themselves and has no bearing upon the floor or upon the guide-rail, the only bearing upon the latter being that of the antifriction-rollers 15. Hence the rotating structure can be operated with a minimum of friction.

Having thus described my invention, I claim and desire to secure by Letters Patent—

1. The combination in a bicycle-carousel, of a series of pairs of bicycles disposed one behind another in a circular course, and a series of connecting-bars having rollers for bearing laterally upon the guide-rail, each connecting-bar having at the rear end laterally-projecting arms with eyes at their outer ends, forks hung to the front axles of each pair of bicycles and extending in front of the front wheels of the same, stems on said forks passing through the eyes of the connecting-frame, and means for securing said stems to said eyes, substantially as specified.

2. The combination in a bicycle-carousel, of a series of pairs of bicycles disposed one behind another in a circular course and a series of connecting-bars having rollers for bearing laterally upon a guide-rail, each connecting-bar having at the front end a fork, one arm of which is connected to the inner portion of the rear frame of the outer bicycle of the pair, the other arm of the fork being connected to the outer portion of the rear frame of the inner bicycle of the pair, substantially as specified.

3. The combination in a bicycle-carousel, of a series of pairs of bicycles disposed one behind another in a circular course and frames for longitudinally connecting said bicycles, each of said frames having the laterally-projecting rear arms, one connected to the front of one bicycle of the pair and the other to the front of the other bicycle of the pair, said arms being disposed at an angle other than a right angle to the longitudinal line of the frame, substantially as specified.

In testimony whereof I have signed my name to this specification in the presence of two subscribing witnesses.

THOS. B. TINNEY.

Witnesses:
F. E. BECHTOLD,
JOS. H. KLEIN.